United States Patent [19]

Turbak et al.

[11] 4,118,350

[45] Oct. 3, 1978

[54] CELLULOSE ACETATE SOLUTIONS CONTAINING METHYLOLATED POLYMERS

[75] Inventors: Albin F. Turbak, Convent Station; John P. Thelman, Kenvil; Andrew B. Auerbach, Livingston, all of N.J.

[73] Assignee: International Telephone and Telegraph Corporation, New York, N.Y.

[21] Appl. No.: 833,077

[22] Filed: Sep. 14, 1977

[51] Int. Cl.$^2$ ............................................... C08L 1/12
[52] U.S. Cl. ................................... 260/15; 106/186; 106/196; 264/200
[58] Field of Search ........................................ 260/15

[56] References Cited

U.S. PATENT DOCUMENTS

| 3,839,527 | 1/1974 | Turbak et al. ........................ 264/200 |
| 3,839,528 | 1/1974 | Turbak et al. ........................ 264/200 |

*Primary Examiner*—Edward M. Woodberry
*Attorney, Agent, or Firm*—James B. Raden; Harold J. Holt

[57] ABSTRACT

The tendency of cellulose acetate solutions, containing methylolated polymers of melamine or guanamine, to prepolymerize or gel is reduced by the addition to the solutions of an amine oxide. The amine oxide also acts to reduce the viscosity of the cellulose acetate solutions.

10 Claims, No Drawings

CELLULOSE ACETATE SOLUTIONS CONTAINING METHYLOLATED POLYMERS

This invention relates to cellulose acetate solutions of the type used in the preparation of shaped cellulose acetate products and more specifically to a process of inhibiting the gelation of such solutions.

U.S. Pat. Nos. 3,839,527 and 3,839,528, both of which issued on Oct. 1, 1974 and are assigned to the present assignee, disclose the production of cellulose acetate fibers of improved dimensional stability. The improved stability of the fibers is obtained by the addition to the cellulose acetate spinning solutions of certain acetone-soluble methylolated melamine or guanamine polymers. The polymers are partially "capped", that is, the methylol groups are alkylated, to render the polymers soluble in the cellulose acetate solvent and to control their reactivity so that they are through the various processing steps, including mixing, filtering, deaerating, spinning and stretching. The alkylation must not be too complete, otherwise the reactivity is insufficient to trigger reaction with the acetate when the fiber or fabric is heat set and cured. Under the conditions frequently used for processing acetate dopes, the polymer-modified solutions disclosed in these patents are stable. However, where commercial processing conditions require that the solutions be subjected to elevated temperatures for prolonged periods, e.g., 80° C. or higher for many hours, the viscosity of the spin dopes increases substantially as a result of premature crosslinking reactions of the polymers.

Melamine resins are known to be very stable under basic pH conditions. In addition, formaldehyde resin manufacturers routinely used amine compounds for the stabilization of formaldehyde resins in paint compositions. The amines serve to alter the pH of the resin system, preventing premature cross-linking or thickening of the paint composition. However, such systems must always be subsequently acidified with strong acids to be ultimately useful and therefore such systems could never be used for textile yarns. Moreover, it has been found that a number of basic materials, which reduce the tendency of polymer-modified cellulose acetate solutions to gel, interfere with subsequent cure of the cellulose acetate fiber. In addition, a number of basic materials, including those that are soluble in the cellulose acetate solutions, were found to be ineffective in preventing premature gelation.

It is accordingly a primary object of the present invention to substantially inhibit the premature gelation of solutions containing cellulose acetate and a methylolated polymer without adversely affecting subsequent cure of cellulose acetate shaped products prepared from such solutions.

It is an additional object of this invention to provide a cellulose acetate solution which is substantially stable at elevated temperatures and which in addition has a lower viscosity than prior cellulose acetate solutions containing methylolated polymers.

The foregoing and other objects of this invention are achieved by the addition to the cellulose acetate-methylolated polymer solution of at least about 0.5% by weight of the methylolated polymer of an amine oxide of the formula $R_3NO$ wherein R is a hydrocarbon radical. The mechanism of the methylolated polymer-amine oxide reaction is not known but it is obviously more complex than a simple acid-base reaction. For example, a particularly effective class of amine-oxides are the morpholine oxides, and particularly 4-methyl morpholine oxide. Although the latter is a significantly weaker base than 4-methyl morpholine, the oxide is significantly more effective in suppressing gelation. Moreover, other Lewis bases, such as epoxides, secondary and tertiary amines and phosphites, are also significantly less effective than amine oxides in preventing premature reaction of the methylol compounds.

Amine oxides are a known class of compounds represented by the formula $R_3NO$, where R is an aliphatic, alicyclic, cycloaliphatic or aromatic hydrocarbon. The oxygen is held to the nitrogen in the amine oxide compound by a semi polar linkage, i.e., by a pair of electrons furnished by the nitrogen atom and the compounds are therefore frequently illustrated by the forumla $R_3N \rightarrow O$. Such compounds are discussed at various places in the literature, as for example in *Chemistry of Heterocylic N-Oxides*, A. R. Katritzky and J. M. Lagowski, Academic Press, New York, 1971. In addition to 4-methyl morpholine oxide, other useful amine oxides are N-coco-morpholine oxide; the pyridine oxides such as 4-methoxy-pyridine-N-oxide, pyridine-N-oxide, 3-hydroxypyridine-N-oxide; and aliphatic amine oxides such as bis (2 hydroxyethyl) octadecylamine oxide and dimethyl hexadecyl amine oxide. The amount of the amine oxide should be at least about 0.5%, based on the weight of the methylolated melamine or guanamine polymer in the solution. This 0.5% minimum is an extremely small concentration of additive, amounting to less than 0.02% based on the weight of a typical cellulose acetate solution. The amount of amine oxide used will depend of course on the severity of the temperature-time conditions to which the solutions are subjected. Normally, for temperatures above 100° C., more than 1% of the amine oxide should be used, based on methylolated polymer weight. Amounts of amine oxide as high as 10%, based on polymer weight, may be used without adverse effects, although normally the amount is less than about 6%.

Shaped cellulose acetate products produced from cellulosic solutions containing the amine oxides possess properties substantially similar to those produced from control solutions without the additive. On the other hand, the gelation of the solutions is substantially decreased as measured by ball fall viscosity determinations before and after heating the solutions in a sealed tube to 90° C. or higher for 16 hours.

The following examples are illustrative of the practice of the invention. Unless otherwise indicated, all parts and percentages are by weight.

EXAMPLE 1

An acetone solution containing 18% by weight of cellulose acetate (39.4% acetyl), 1.8% of a capped methylol melamine polymer and 0.018% (1.0% based on melamine) polymer of 4-methyl morpholine oxide was heated at 100° C. for 16 hours is a sealed tube. The capped methylol melamine polymer was a commercially available melamine-formaldehyde polymer prepared from 3.2 moles of formaldehyde for each mole of melamine with approximately 2 moles of methanol used in capping. The polymer had a degree of polymerization of 2, an approximate molecular weight of 380, was 72% alkylated with methyl groups and contained 28% free methylol groups.

Ball fall viscosities were determined for the above solution before and after heating. The tests were repeated for a series of additivies other than 4-methyl morpholine oxide, in identical amounts and in an identical manner. The relative efficiency of the various additives in preventing viscosity increases, and hence gelation, are shown in Table I.

TABLE I

| Additive | Viscosity Increase final Visc./Original Visc. |
|---|---|
| 4-Methyl morpholine oxide | 1.6 |
| 4-methyl morpholine | 5.3 |
| Triethyl phosphite | Same as control |
| Tributyl amine | 5.6 |
| Dipentene dioxide | Same as control |
| 2-Methyl pyrrollidone | Same as control |
| Control (no additive) | 13.4 |

4 Methyl morpholine oxide also had no effect on the ultimate cure of the fibers. It should be noted in the above Table that all of the materials tested as additives are Lewis bases. The dipentene dioxide is an epoxide compound known to be a hydrogen scavenger.

EXAMPLE 2

Example 1 was repeated using 0.036% based on solution weight (2.0% based on melamine polymer weight), of a variety of amine oxides. The relative efficiency of the amine oxides in inhibiting gelation is shown in Table II.

TABLE II

| Additive | Viscosity Increase Final Visc./Original Visc. | Original Visc. (poises) |
|---|---|---|
| 4-Methyl morpholine-4-oxide | 1.4 | 170 |
| Pyridine-N-oxide | 2.5 | 190 |
| N-coco-morpholine oxide | 3.2 | 220 |
| dimethyl hexadecyl amine oxide | 2.6 | 210 |
| control | 13.4 | 270 |

Although the efficiency of the amine oxides varied considerably, all are shown to decrease the tendency to gelation. Further, all amine oxides lowered the original solution viscosity. Moreover, none of the amine oxides had any effect on the ability of fibers prepared from the solutions to cure.

EXAMPLE 3

A solution was prepared by dissolving 916 grams of cellulose acetate (39.7% acetyl) in 3159 ml of acetone. Total solution water content was adjusted to 2%. Mixing was accomplished using a helical mixer over a 16-hour period. To this solution 100 grams of a methyl capped methylol melamine compound and 1 gram of 4-methyl morpholine oxide were added in 100 grams of acetone. The resulting solution was stirred for an additional 4 hours prior to a double stage pressure filtration. The solution was then deaerated on standing for 12 hours. The resulting acetone spin dope was then spun through a 40-hole (0.06 mm) spinnerette at a head pressure of 300-400 psig with a head temperature of 60°-70° C. Jetting rate was approximately 30 ml/min. with a takeup of 1030 linear feet/min. This yields a stretch of 14%. Cell jacketed temperature was maintained at 100° C. during spinning. The resultant 175 denier acetate yarn was twisted to 2.5 turns/inch and evaluated. Properties of this yarn are shown in Table III.

EXAMPLE 4

Example 3 was repeated using a solution containing 916 grams of cellulose acetate, 100 grams of a capped methylol melamine compound and 1 gram of N-coco-morpholine oxide in 3159 ml of acetone. Properties of this yarn are also shown in Table III.

TABLE III

| Ex. No. | Additive | Tenacity (grams/denier) Dry | Tenacity (grams/denier) Wet | Elongation (%) Dry | Elongation (%) Wet |
|---|---|---|---|---|---|
| 3 | 4-methyl morpholine oxide | 1.34 | 0.79 | 20.5 | 23.5 |
| 4 | N-coco-morpholine oxide | 1.55 | 0.83 | 19.3 | 22.8 |
|  | Control | 1.38 | 0.79 | 22.4 | 22.51 |

In addition to prevention of premature crosslinking, the amine oxides also act to lower the viscosity of the cellulose acetate-polymer solutions, as shown by the data in Table II. The compounds appear to promote solubility and produce a solution of greater clarity and lower viscosity than a corresponding solution without the amine oxide. This enables a fiber or film to be spun or cast at a higher cellulose acetate concentration and thus results in greater productivity than would otherwise be possible.

The methylolated melamine and guanamine polymers to which the invention is directed are in general those which are soluble in the cellulose acetate solvent and capable of reacting with the cellulose acetate to form a crosslinked structure. Particularly suitable examples of melamine polymers are shown in the aforesaid U.S. Pat. No. 3,839,528 and of quanamine polymers in the aforesaid U.S. Pat. No. 3,839,527. The disclosures of these patents are hereby incorporated by reference. As shown in these patents, the methylol groups of the melamine and guanamine polymers have between 30 and 80% of their free methylol groups alkylated with a 1 to 4 carbon atom alkyl group and have a degree of polymerization between 2 and 10. The melamine or guanamine rings are connected by at least one

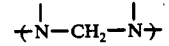

linkage.

The invention is useful for the production of fibers, cast films or other cellulose acetate shapes by known processes. The cellulose acetate may contain from 35.5% to 45.8% acetyl groups and may be a triacetate but is preferably a diacetate having a degree of substitution of acetyl groups of from 2.05 to 2.77. In the case of the diacetate, the solvent will be acetone; in the case of a triacetate, the solvent will be methylene chloride.

We claim:

1. A process for inhibiting the gelation of a cellulose acetate solution containing a methylolated polymer soluble in said solution and selected from the group consisting of melamine and guanamine polymers, comprising adding to said solution an amine oxide of the formula $R_3NO$ wherein R is a hydrocarbon radical, the amount of amine oxide being at least about 0.5% by weight of the methylolated polymer.

2. The process of claim 1 in which the cellulose acetate is a diacetate and the cellulose acetate is dissolved in an acetone solvent.

3. The process of claim 1 in which the amine oxide is selected from the group consisting of 4-methyl morpholine oxide, pyridine-N-oxide, N-coco-morpholine oxide and dimethyl hexadecyl amine oxide.

4. The process of claim 3 in which the amine is oxide is 4-methyl morpholine-4-oxide.

5. A cellulose acetate solution of reduced tendency to gelation comprising a solution of cellulose acetate containing a methylolated polymer soluble in said solution and selected from the group consisting of melamine and guanamine polymers, said solution containing at least about 0.5% by weight of the methylolated polymer of an amine oxide of the formula $R_3NO$ wherein R is a hydrocarbon radical.

6. The solution of claim 5 in which the cellulose acetate is a diacetate and the cellulose acetate is dissolved in an acetone solvent.

7. The solution of claim 5 in which the amine oxide is a morpholine oxide.

8. The solution of claim 7 in which the amine oxide is 4-methyl morpholine-4-oxide.

9. The solution of claim 5 in which the melamine polymer has at least one

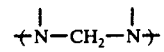

linkage between melamine molecules, a degree of polymerization of between 2 and 10 and between 30% and 80% of its free methylol groups alkylated with a 1 to 4 carbon atom alkyl group.

10. The solution of claim 5 in whih the guanamine polymer has at least one

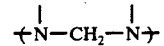

linkage between guanamine molecules, a degree of polymerization of between 2 and 10 and between 30% and 80% of its free methylol groups alkylated with a 1 to 4 carbon atom alkyl group.

* * * * *